United States Patent [19]

Burge et al.

[11] 4,217,132

[45] Aug. 12, 1980

[54] METHOD FOR IN-FLIGHT COMBUSTION OF CARBONACEOUS FUELS

[75] Inventors: Harland L. Burge, Garden Grove; John A. Hardgrove, Rolling Hills Estates; Walter F. Krieve, Rancho Palos Verdes, all of Calif.

[73] Assignee: TRW Inc., Redondo Beach, Calif.

[21] Appl. No.: 837,234

[22] Filed: Sep. 27, 1977

[51] Int. Cl.$^2$ .............................................. C22B 1/10
[52] U.S. Cl. .......................................... 75/26; 75/29; 75/72; 75/77; 75/83; 75/86; 431/9
[58] Field of Search ............ 75/26, 29 FE, 72, 77 PB, 75/86, 83; 431/9, 173

[56] References Cited

U.S. PATENT DOCUMENTS

| 720,490 | 2/1903 | Ruthenburg | 75/26 |
|---|---|---|---|
| 1,758,188 | 4/1930 | Cordy et al. | 266/172 |
| 1,862,751 | 6/1932 | Ingraham | 266/172 |
| 4,147,535 | 4/1979 | Lilja et al. | 75/26 |

FOREIGN PATENT DOCUMENTS

| 522098 | 6/1940 | United Kingdom . |
| 692393 | 6/1953 | United Kingdom . |
| 700670 | 12/1953 | United Kingdom . |
| 709094 | 5/1954 | United Kingdom . |
| 714925 | 9/1954 | United Kingdom . |
| 870553 | 6/1961 | United Kingdom . |

OTHER PUBLICATIONS

*Handbook of Gasifiers & Gas Treatment Systems*, FE 1172-H, Feb. '76, pp. 3-6, Nat. Tech. Info. Service, Dept. of Comm., Springfield, Va. 22161.

*Primary Examiner*—M. J. Andrews
*Attorney, Agent, or Firm*—John J. Connors; Benjamin DeWitt

[57] ABSTRACT

An apparatus and method for combusting carbonaceous fuels includes a reaction chamber defining a reaction zone and means for injecting fuel and oxidizer gas in a manner to produce in the reaction zone a wheel-type flow of the fuel-gas mixture. In preferred embodiments, the high velocity wheel-type flow operates to suspend fuel or other reactant particles in the swirling gas for residence times required for substantially complete reaction of the particles prior to the particles impinging against the walls of the reaction chamber. High angular veocities and the resulting centrifugal forces operate to remove substantially all slag from the gas as it approaches the downstream end of the reaction chamber. Operating temperatures are maintained at a level to avoid excessive volatilization of slag and thereby promote separation of liquid slag from the gaseous reaction products. Dense phase flow is employed for transporting pulverized reactants such as coal to the reaction chamber and injecting the reactants through a pintle fuel injector.

17 Claims, 24 Drawing Figures

METHOD FOR IN-FLIGHT COMBUSTION OF CARBONACEOUS FUELS

BACKGROUND OF THE INVENTION

In conventional slagging furances for steam generation and the like, solid carbonaceous fuels, such as pulverized bituminous or semibituminous coal, are fed into a reaction zone. The combustion temperature is maintained at or above the ash fusion temperature in order to convert a major portion of the non-combustible ash present in the fuel to molten slag. Such furnaces have been designed for atmospheric or near atmospheric operating pressure and, as a result, have generally been relatively very large, have required the use of ceramic structures to prevent erosion of the combustion chamber by the high temperature combustion products, have released large quantities of pollutants into the atmosphere, and have been severely limited as to the applications for which they could be utilized. The relatively large size of such furances has resulted in relatively high heat losses, lower overall thermal efficiency, and undesirably low power density, that is, thermal power output per unit of volume of the furnace.

SUMMARY OF THE INVENTION

We have invented methods and apparatus for combusting solid and liquid carbonaceous fuel with improved efficiency, optimized energy recovery from the fuel, and increased power density. Improved thermal and volumetric efficiencies are achieved by providing a mixture of fuel and oxidizer gas that travels helically through a wheel-type flow field adapted to separate a major portion of the ash and slag from the gaseous combustion products by centrifugal action, without losing undesirably large fractions of unburned fuel in the slag. The space occupied by our combustion apparatus is small relative to conventional combustion apparatus having equivalent thermal power output. We control temperature within the reaction zone so that most of the non-combustibles present in the fuel are fused, deposited in a liquid state on the reaction chamber walls, and separately removed from the reaction zone, and we may add chemicals to the reaction zone which reduce pollutants in the exhaust gases. One embodiment of our apparatus is particularly adapted for use with magnetohydrodynamic electric generators. Our apparatus is also suitable for retrofitting heat energy facilities originally designed and constructed for consumption of natural gas or oil, and it may be used to conduct metallurgical process or other chemical processes such as cracking, coal pyrolysis, or the production of producer or synthesis gas.

Our apparatus has a chamber having walls which define a reaction zone. There is a fuel inlet in the chamber through which particles of solid or liquid fuels are fed. For most applications, the particles of fuel will be less than about 750 microns diameter. Suitable fuels are pulverized coal, comminuted oil-bearing shale, petroleum residuals, and the like. There is an oxidizer inlet in the chamber adapted to introduce into the combustion zone swirling oxidizer gas such as air or pure oxygen. An outlet downstream of the inlet provides means for exhausting from the chamber gaseous reaction products and any fine particles of slag which are not collected on the inner walls of the chamber.

The characterizing feature of our apparatus is that the particles of fuel are essentially completely reacted prior to their impinging against the inner wall of the chamber. This is achieved by controlling the aeroballistic regime within the reaction zone so that the burn time of the particle generally is less than the flight time of the particle to the chamber wall. A primary feature of combustion in an aeroballistic regime is the ability to optimize mixing an modify the combustion process for variable combustion conditions such as carbon capture by the slag, turndown ratio, fuel type or composition, slag removal percentage, carbon burn-out efficiency, and combustion zone additives. Because of this feature, our apparatus is substantially smaller in size than burners having equivalent thermal power output. Also, because we control the flight of the particle as it is burning, our apparatus is especially suited to make producer gas, synthesis gas, or perform the meltallurgical processes discussed later.

In a preferred embodiment, the oxidizer gas is introduced into a cylindrical chamber as a plurality of separate streams. One gas stream is injected into the reaction zone in a direction substantially parallel to the longitudinal axis of the reaction chamber, and a second stream enters tangentially relative to the wall of the chamber. By regulating the mass flow rates and velocities of the two gas streams and the fuel being introduced into the chamber, we are able to establish and maintain in-flight burning of the fuel particles. Specifically, we obtain a wheel-type flow of the oxidizer-fuel mixture in the reaction zone. By wheel-type flow we mean either a substantially pure wheel flow or a combined wheel-vortex flow. We shall discuss both types in detail later, but both types provide an aeroballistic regime in which the burning particle has a substantially longer residence time in the reaction zone than would be attained by the vortical-type flow employed in some conventional burners.

The apparatus and its mode of operation are such that a major portion of the slag content of the fuel may be removed from the gaseous reaction products before such products exit the reaction chamber. Specifically, in a preferred embodiment, the reaction chamber is provided with a slag baffle at the output end of the combustion zone. The wheel-type flow operates to transport slag particles radially toward the reaction chamber walls near the downstream end of the reaction chamber, and the reaction temperatures within the reaction zone are maintained at levels such that slag volatilization is minimized. Up to about 95% of the slag is deposited on the walls and removed from the reaction zone as a liquid. Liquid state separation of the slag from the gaseous reaction products is controlled, at least partly, by controlling the relative input rates of fuel and air, and thereby controlling temperatures within the reaction zone. As a result, liquid droplets of slag deposited on the inner surfaces tend to remain in liquid form and may be drained to the lower portion of the reaction chamber and removed through a slag trap or other appropriate means for removing and disposing of the slag. In addition, the use of a metallic water-cooled reaction chamber promotes the development of a layer of slag solidified on the inner surface of the reaction chamber. Because the layer of solidified slag on the inner walls has a relatively low thermal conductivity, it serves as a liner which protects the internal chamber wall and reduces heat losses. The mechanisms for controlling fuel input and oxidizer input, taken together with the slag baffle and the water-cooled reaction chamber, constitute a means for minimizing the concentration of volatilized slag in the output gas stream and removing the bulk of the slag in liquid form.

In the preferred embodiments, fuel is fed to the first reaction zone in the form of finely divided carbonaceous material mixed with and carried by a carrier gas. The fuel injection subsystem preferably comprises a pintle valve assembly by which the fuel input rate may be controlled and, as will be described in more detail later, the fuel may be dispersed within the reaction zone. For different operative modes, it is desirable to use different fuel dispersion patterns within the reaction zone. This is achieved by placing the pintle valve in different locations or varying the spray angle at which fuel is injected relative to the longitudinal axis of the reaction chamber. In one preferred embodiment, the pintle valve assembly includes a coaxially positioned, longitudinally adjustable pintle having an enlarged terminal portion. A substantially conical surface on the enlarged terminal portion operates as a deflector for directing the input fuel radially outward from the pintle valve assembly in a generally cone-shaped dispersion pattern. The adjustment of fuel flow ratio is accomplished by a combination of two mechanisms. In the first, the ratio of fuel to carrier gas is varied by increasing or decreasing the carrier gas flow. Solid to gas ratios of up to 100:1 and down to essentially all carrier gas enable throttling control over a wide range with no moving parts in the pintle valve. The second way to control fuel input is by longitudinal adjustment of the pintle valve.

One embodiment of our invention is specifically designed and adapted for use in magnetohydrodynamic electrical power generation. This apparatus includes a second reaction chamber located immediately downstream from the slagging baffle of the first reaction chamber. This embodiment includes means for introducing additional oxidizer gas and mixing it with the gaseous reaction products exiting from the first reaction zone. By this arrangement, the first reaction zone may be operated fuel rich so that the exhaust gases contain substantial quantities of incompletely combusted products such as carbon monoxide and hydrogen. In the second chamber, these products are further reacted to produce additional thermal energy. Because about 90% or more of the slag has been removed in the first reaction zone, the temperature in the second reaction chamber may be allowed to reach levels substantially higher than the slag volatilization temperature to thereby improve the thermodynamic efficiency in subsequently converting the thermal power to electrical power.

This embodiment of our apparatus includes, near the input end of the second reaction chamber, a reactant input device by which selected additional reactants may be added to the high temperature gas stream entering the second reaction chamber. In addition, the second reaction chamber may include arrangements for decreasing or eliminating the high angular velocity of the gaseous reaction products. In one preferred embodiment, modification of the angular velocity is accomplished by injection of supplemental air in a direction and at a velocity such that the angular momentum of this additional oxidizer gas substantially counterbalances and offsets the angular momentum of the reaction products exiting from the first reaction zone. Such introduction of additional oxidizer gas into the second reaction chamber constitutes a means for deswirling, by momentum interchange, the gaseous reaction products.

We have discovered that the method and apparatus of the present invention may advantageously be utilized for smelting of certain metallic ores, such as oxides and sulfides of copper, zinc, iron, lead, nickel, and silver. In metallurgical processing the fuel input rate is first adjusted or predetermined to operate at a level sufficient to maintain the desired temperature regime within the combustion zone. With the fuel input level established, the air input is adjusted for fuel-rich or fuel-poor operation of the mixture in the reaction zone as required. In many metallurgical processes, the reaction zone preferably is maintained on the fuel-rich side of stoichiometry, and thereby provides a reducing atmosphere into which ore concentrates may be injected. The metallic ores are preferably introduced into the reaction zone as a finely divided powder, either mixed with the pulverized solid fuel or, alternatively, mixed with a carrier gas and injected into the reaction zone through a separate pintle valve or other appropriate means for injecting reactants. Ore concentrates so injected into the fuel-rich flow of gaseous reaction products are reduced by the fuel-rich gases mixed therewith, and molten droplets of metal are formed in the downstream portion of the rotating body of gaseous reaction products. With the system properly adjusted, these molten metal droplets experience centrifugal forces as they progress toward the exit end of the reaction zone and are thereby accelerated toward the radial extremities of the reaction chamber. Accordingly, wheel-type flow within the combustion zone operates to separate the molten metal from gaseous combustion products and deposit the molten metal on the reaction chamber walls from which it may be carried off with the slag.

While the most metallurgical processes involve fuel-rich operation and maintenance of a reducing atmosphere in the combustion zone, it is to be understood that our invention is not so limited. Specifically, we have found that metallic copper may be produced from sulfides of copper, such as chalcopyrite and chalcocite, while the combustion zone is operating at balanced stoichiometry or mildly oxidizer-rich.

In accordance with another feature of our invention, other reactants may be added to the reaction zone, either together with the ore concentrate or separately for such chemical reaction purposes as may be indicated by the chemistry of the particular type of reaction being conducted in the reaction zone. For example, additives may be used to render the slag more amenable to subsequent separation of the metal product or to enhance capture of potential air pollutants which would otherwise be created in the burning process. By the addition of selected reactants, together with temperature control, sulfur oxides ($SO_x$) effluents may be removed from the gaseous combustion products without the use of conventional stack-gas scrubber apparatus. To control $SO_x$ emissions, treatment chemicals such as carbonates may be added to the input fuel or introduced separately to the reaction chamber. The formation of nitrogen oxide ($NO_x$) pollutants is controlled by maintaining fuel-rich combustion conditions and thereby limiting temperatures to levels low enough to prevent the rapid formation of $NO_x$.

Another feature of our invention is that we are able to make producer gas or synthesis gas. We contemplate using our apparatus to burn carbonaceous fuels to make a type of producer gas which is fed to conventional oil or gas fired burners. It is desirable for such a producer gas to have the maximum amount of carbon monoxide obtainable. This will increase its BTU content and, therefore, maximize its economic value. Although some water will be carried into the reaction zone with the coal and air, it may be undesirable to add water or steam to the reaction zone, since this would decrease the amount of carbon monoxide produced. Injecting suitable chemicals into the reaction zone to remove $SO_x$ would be desirable, however. During periods of oil and gas shortages, our apparatus can thus be used to make a clean burning fuel which is a substitute for oil and natural gas.

A synthesis gas may be produced by utilizing pure oxygen in place of air during the combustion process and injecting an amount of steam that will give the desired ratio of carbon monoxide and hydrogen in the synthesis gas. The reason oxygen is used in place of air is to eliminate nitrogen which is a diluent and, in many instances, a deleterious component of synthesis gas. Because coal can be burned cleanly within our apparatus so that $SO_x$ and slag are removed from exhaust gases, our apparatus produces synthesis gas at a reduced cost compared to conventional techniques.

In accordance with another feature of our invention, the apparatus may be used to generate high temperature exhaust gases which are utilized to process carbonaceous material such as coal, shale, or oil. A suitable system for processing such carbonaceous materials would include a first stage comprising our apparatus and one or more stages coupled to our apparatus. The carbonaceous materials are fed into one or more of these downstream stages, and the exhaust gases flowing from the first stage or second stage into the subsequent stage or stages provide heat for processing the carbonaceous materials. Solids are separated from the gaseous components exiting the final stages of the system and volatile hydrocarbons are recovered. In processing coal, the hot gases will volatilize water and hydrocarbons in the coal. The valuable hydrocarbons would be recovered, and the remaining char, being a lighter weight, is more economically transported than the unprocessed coal. For example, coal comprises as much as 20-weight percent water. The cost of shipping coal containing such high quantities of water would more than offset the cost of treating the coal using our apparatus. When shale is retorted by heat processing, kerogen in the shale decomposes into oil, and the oil is then volatilized to separated it from the solid shale minerals. Oil is processed by flash cracking in which a feed stream of oil is injected into the downstream stages of the system and heated rapidly. The oil decomposes into lighter weight hydrocarbons which are then separated from the inert gaseous combustion products.

A more complete understanding of the present invention, as well as recognition of additional advantages, will be afforded to persons skilled in the combustion arts from consideration of the following detailed description of exemplary embodiments of our invention as illustrated in the appended drawings.

DETAILED DESCRIPTION OF THE INVENTION

General Arrangement

Figure 1:
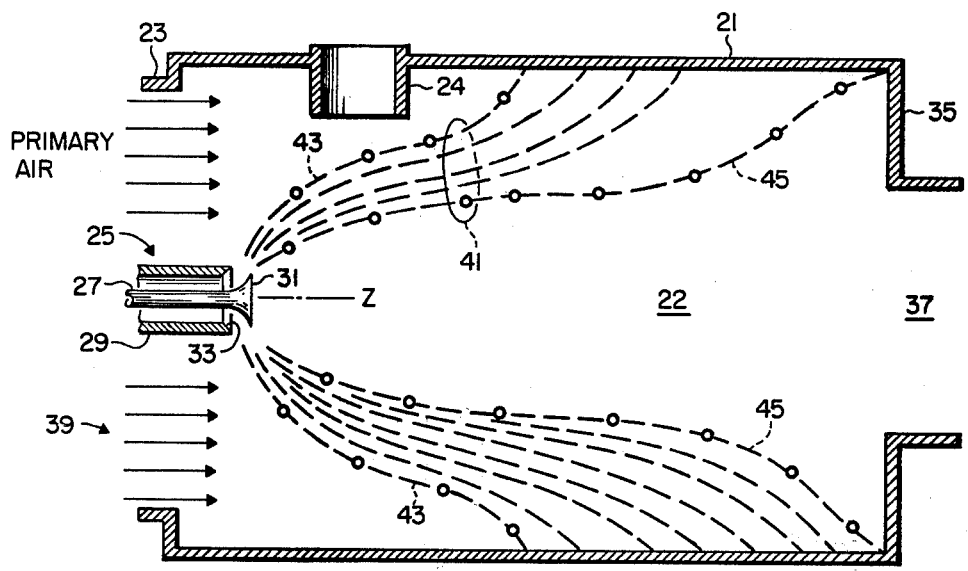
FIG. 1 is a schematic diagram of an apparatus in accordance with our invention.

For an understanding of the fundamental concepts of our invention, it is useful to consider first the simplified diagrammatic representation of apparatus 10 shown in FIG. 1. The apparatus 10 includes a reaction chamber 21 which is a metallic cylinder symmetrical about the longitudinal axis Z and defining a cylindrical reaction zone 22. At an inlet end 23, primary or longitudinal air enters the reaction zone 22 along lines parallel to the axis. Downstream from end 23 is an injection duct 24 for introducing a secondary air tangentially into the reaction zone 22. A fuel injection pintle valve 25, aligned coaxially with the chamber 21 at the inlet end 23, includes a pintle 27 adapted for longitudinal adjustment within a fuel input tube 29 through which fuel flows into the reaction chamber. Pintle 27 has a tapered end portion 31 for deflecting the fuel radially outward from the longitudinal axis in a bell-shaped dispersion envelope 41. When the pintle is moved to the left, as shown in FIG. 1, the tapered surface of end portion 31 moves toward a valve seat 33 at the end of tube 29 to reduce gradually the rate at which fuel flows into the reaction zone 22. By this arrangement, pintle valve 25 variably controls the input fuel mass flow rate. At its right-hand end, the reaction chamber 21 includes a baffle 35 having a central aperture 37 through which gaseous reaction products generated in reaction zone 22 exit from the chamber. The baffle 35 separates particulate matter and slag droplets from the gaseous reaction products so that the stream passing out through aperture 37 is relatively free of liquid slag and solid particles.

Figure 2A:
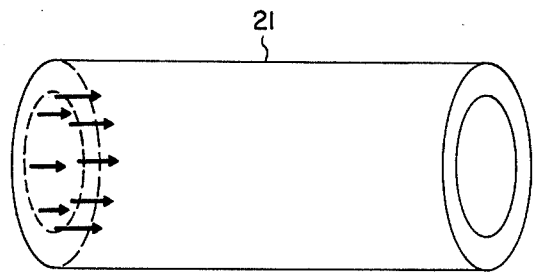
FIGS. 2a through 2d are perspective illustrations of helical wheel-type flow realized in the apparatus of FIG. 1.
Figure 2B:
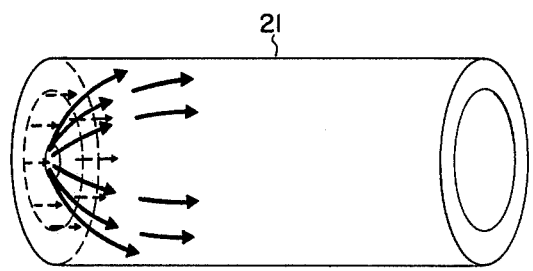
Figure 2C:
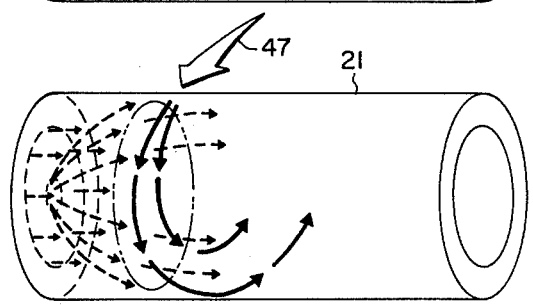
Figure 2D:
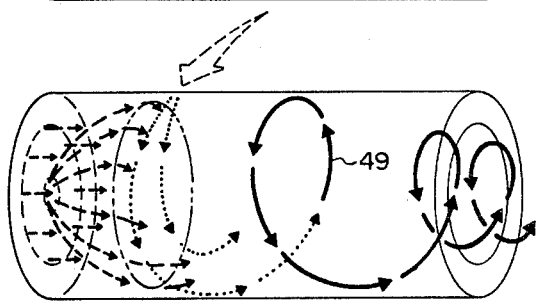

As shown in FIGS. 2a–2c, the primary air, entering reaction zone 22 annularly around the pintle valve 25, is intercepted by secondary air entering the reaction zone from duct 24. Carbonaceous fuel, for example, pulverized coal, is fed into the reaction chamber 21 in the form of a dense phase mixture with a carrier gas such as nitrogen ($N_2$), compressed air or gaseous fuel. The tangentially injected secondary airstream 47 thoroughly intermixes with the fuel and the primary air and accelerates the solid fuel particles in accordance with fluid flow principles discussed in greater detail hereinafter. As shown in FIG. 2d, the mixture of burning fuel particles and high temperature gaseous reaction products travels along a helical path 49 to the downstream end of the reaction zone 22 where the gaseous reaction products are forced inwardly by the baffle 35 and exit from the chamber 21 through the central aperture 37. As the reaction products are forced inwardly by baffle 35, the angular velocity increases sharply in the region closely adjacent to the baffle so that slag droplets are centrifuged out of the gas stream and are deposited, for the most part, on the walls of the chamber and the inside surface of baffle 35.

Particles carried in the bell-shaped dispersion envelope 41 move longitudinally through the chamber at an average velocity determined by the combined mass flow rates of air and fuel. Small particles tend to be caught up and carried with the mixture stream, while larger particles tend to follow trajectories determined in part by their original velocity vectors. Although large particles are accelerated by the rapidly rotating gases, they are accelerated to a lesser extent than smaller particles. Thus, as shown in FIG. 1, line 43 represents the outer boundary of the helical trajectories of relatively large fuel particles, for example, particles having diameters of about 100 microns. Such large particles do not in fact follow the line 43 but rather travel helically about the longitudinal axis within the envelope 41 of which the outer limit is indicated by line 43. Similarly, relatively small particles, for example, coal particles of about ten micron diameter, travel in helical paths within the envelope 41, the inside limit of which is indicated by line 45. Thus, substantially all particles in the size range from about ten microns to about 100 microns diameter follow helical trajectories within the envelope 41 between lines 43 and 45. Mixing of the fuel with the two airstreams is accompanied by momentum interchange and the formation of a mixture stream which extends as a substantially cylindrical helix along the length of the chamber. For reasons which will become more apparent hereinafter, it is desirable to maintain a wheel-flow field or a combined wheel-vortex flow field within a major portion of the reaction zone 22.

The bell-shaped dispersion envelope 41, as shown in FIG. 1, is based on assumed flow velocities of 160 feet per second for the secondary air, about 50 feet per second for the longitudinally directed primary air, and about 10 to 50 feet per second for the injected carrier gas and fuel mixture. It will be understood that the present invention is not limited to those specific velocity values or even to the ratios implied by those values. By selection of the optimum relationship between secondary air velocity, primary air velocity, fuel input velocity, and fuel direction, the shape of the envelope 41 may be adjusted over a wide range. Such selection will depend on the particular fuel being used and other characteristics desired in the specific process.

In some instances, it is desirable to operate in a fuel-rich environment, that is, a reducing atmosphere. For example, fuel-rich operation is desirable to reduce reaction temperatures and limit slag vaporization as will be subsequently discussed.

DESIGN CONSIDERATIONS FOR THE REACTION CHAMBER

In order to have a relatively compact reactor, it is necessary that the fuel particles be relatively small. In general, the fuel particles should be less than about 750 microns in diameter and preferably less than about 75 microns in diameter. Such small particles will burn within a few milliseconds. Our reactor is designed so that the swirling gases generate sufficient centrifugal force so that the particles move to the interior wall of the chamber but are essentially all completely burned prior to impinging against the chamber wall. For example, a particle having a diameter of 75 microns burns within about 60 milliseconds. The aeroballistic environment into which this particle is injected preferably is controlled so that the forces acting on the particle will not move it to the wall prior to complete combustion.

It is generally understood that small particles are affected by aerodynamic drag forces to a greater extent than large particles. For example, when a small particle enters the swirling gases in the reaction zone, the oxidizer gas rushing by the particle creates a drag force which almost instantaneously changes the speed and direction of the small particle so that it coincides with the speed and direction of the swirling gases. In contrast, the inertia of a very large particle tends to keep this particle moving at the speed and direction at which it entered the swirling gas. For the small particles which we use almost all the particles attain the velocity of the swirling gases within a few milliseconds after entering the reaction zone.

As these particles swirl in the gases, a centrifugal force is generated which is directly proportional to the mass of the particle and the angular velocity of the particle. Larger particles have greater centrifugal forces acting on them than smaller particles and the effect of the drag force is less. Consequently, large particles tend to move more rapidly to the exterial wall than the smaller particles. By controlling the tangential velocity of the swirling gases, one controls the centrifugal and drag forces acting on the particles. This enables one to select the suitable tangential velocity of the swirling gases so that the large particles are burned before they impinge against the wall of the reaction chamber. The interaction of the incoming gases provides a vehicle by which we may vary the centrifugal and drag forces acting on the particles. By controlling the ratio of mass flow rates of the tangential and longitudinal gas streams, we are able to insure that essentially all the particles will burn before they strike the chamber wall. Moreover, the more wheel-like the flow of gases within the reaction zone, the greater will be the flight time of the particulates in the chamber.

In designing the reaction chamber, it is desirable to maxmize the amount of slag that is captured in this chamber. Since small particles do not move to the wall as quickly as large particles, very small particles will escape through the aperture of the chamber, and there is always a certain loss of very minute slag droplets. However, chamber length and aperture opening are selected so that at least approximately 90 to 95% of the slag is captured within the chamber.

Care is taken not to inject the fuel particles with a velocity so great that the momentum of the particle would carry it to the chamber wall prior to burning. In other words, the velocity of the fuel particle must be sufficiently less than the velocity of the swirling gases so that the gases will act on the incoming particles and capture them in the swirl for a sufficient length of time to insure complete combustion.

BEHAVIOR OF PARTICLES IN REACTION ZONE

Full appreciation of the characteristics of the wheel-type flow employed in our invention requires a detailed consideration of the gas flow and forces generated by the gases that act on the particles.

There are two types of gas flows in the swirling gases in the reaction zone: vortex flow and wheel flow. In a theoretically pure vortex flow, the tangential velocity decreases as a function of radial position. In other words, the maximum tangential velocity is near the center of the rotating flow field. Vortex flow is mathematically characterized by the expression:

$$V_t \sim \frac{R_o V_o}{R}$$

where
$V_t$ = tangential velocity,
$R_o$ = radius of the chamber,
$R$ = position of reference on radius, and
$V_o$ = tangential velocity at the outer radius.

Figure 3:
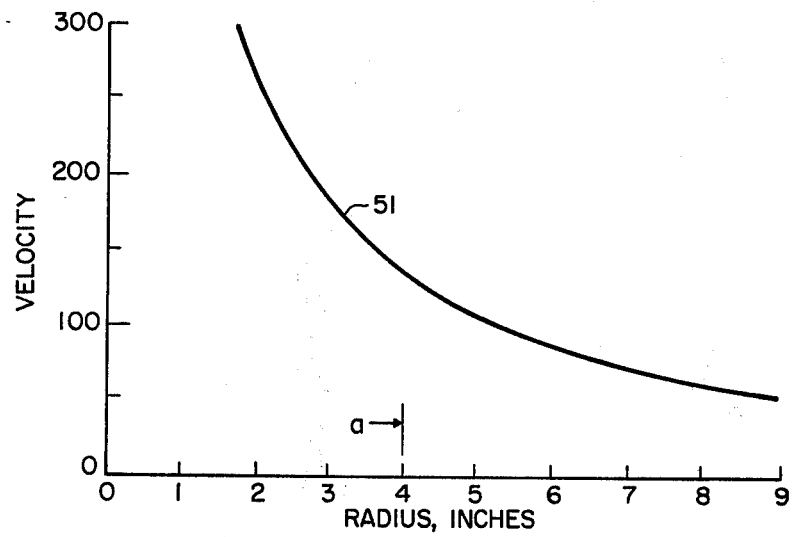
FIGS. 3 through 6 are graphs showing the characteristics of several different types of high velocity fluid flow and the motion of particles in a rotating fluid environment.

Theoretically pure vortex flow is graphically illustrated in FIG. 3, where curve 51 is a plot of tangential velocity as a function of radial distance from the axis of rotation in a vortex flow field. As shown by curve 51, tangential velocity increases with decreasing radial position and, if pure vortex flow were maintained, would be extremely high near the axis.

Figure 4:
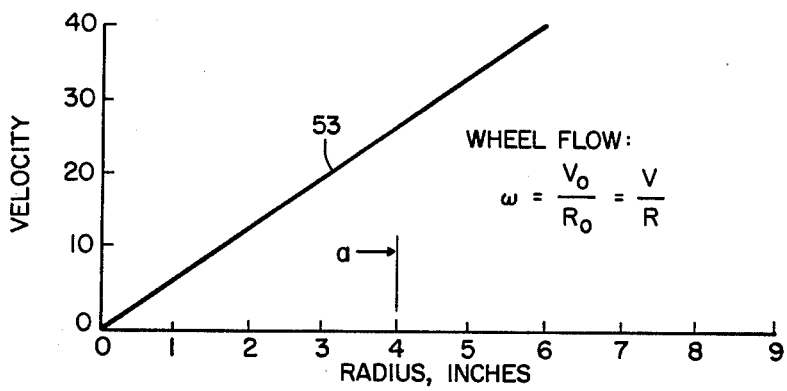

In wheel flow, the entire fluid body spins together like a solid body. This type of flow we refer to as "pure wheel flow." Pure wheel flow is mathematically characterized by the expression:

$$V_t \sim R\omega$$

where
$V_t$ = tangential velocity,
$R$ = position reference in the radial direction, and
$\omega$ = angular velocity at R. Thus, in wheel flow the tangential velocity of the gas at any given radial position R is directly proportional to its radial position from the rotational axis. This is, of course, the distinguishing characteristic of a rotating solid body whose components are fixed in relation to each other. The angular velocity, $\omega$, is the same for all radial positions. Thus, in pure wheel flow, $\omega$ is a constant for all points (positions) in the same cross-section, with maximum tangential velocity occurring at the outer radius, as contrasted to pure vortex flows where the maximum tangential velocity is close to the axis. Pure wheel flow is illustrated in FIG. 4 where line 53 represents tangential velocity plotted as a function of radial distance from the rotational axis Z.

Figure 5:
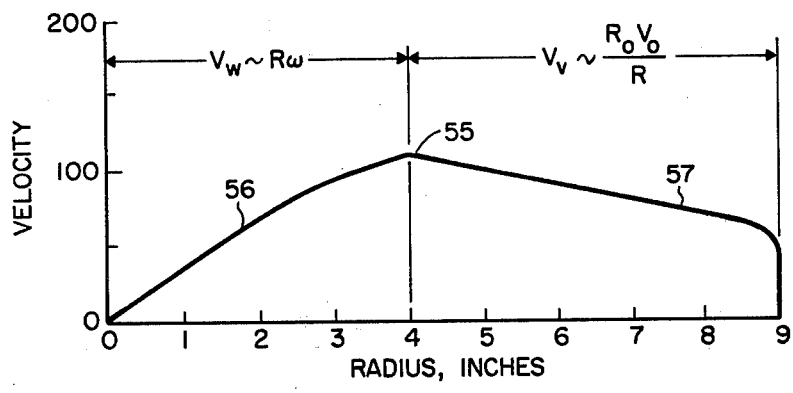

In mixing axial air with tangential air, the flow of gas in the reaction zone 22 may be controlled so that it corresponds substantially to the velocity profile illustrated by curve 55 in FIG. 5, This curve is typical of the flow regime in the reaction zone 22. Curve portion 56 shows the region where velocity increases substantially as a linear function of radial distance from the axis of rotation and corresponds to pure wheel flow. The portion of the flow field more nearly corresponding to pure vortex flow is indicated by curve portion 57. In this combined wheel-vortex flow, the tangential velocity near the axis increases substantially linearly with distance from the axis to a maximum velocity as a distance approximately equal to the radius of the baffle aperture 37. Outwardly beyond that point, the velocity changes approximately inversely as the distance from the axis, and more nearly corresponds to vortex flow as discussed above and illustrated in FIG. 3. Thus, flow field used approximates pure wheel flow in a core region of the combustion zone, has a transitional portion indicated at a, in FIGS. 3 and 4, and is substantially similar to vortex flow in an outer shell portion of the flow field.

The flight time of larger particles can be significantly increased by minimizing the tangential velocity of gases encountered early in their flight through the chamber. Thus, it is desirable that the core region from R=0 to R=a should be as large in diameter as practically feasible. The actual diameter of the wheel-flow core region will vary along the length of the chamber and, near the downstream end, tends to be approximately equal to the radius of the baffle aperture 37. In upstream portions of the combustion zone the radius "a" of the wheel-flow core region can be maximized by controlling velocities, mass flow rates, and the fuel injection mode to thereby make the core region as large as possible consistent with capture of slag.

In accordance with our invention, by regulating velocities and mass flow rates of the fuel and both input airstreams, we control momentum transfer between the axial and tangential airstreams and the fuel, so that the flow field in reaction zone 22 is similar to the wheel-vortex flow illustrated by FIG. 5, and therefore, long flight times for particles are realized. As a result in a chamber as small as 18 inch diameter, we realize flight times for large particles of the order of 30 to 70 milliseconds. This aeroballistic control of chemical reaction in free flight is exploited to minimize loss of unburned fuel in the slag and to limit the amount of slag exiting the reaction chamber through aperture 37. This may also be enhanced by injecting fuel with a velocity less than that of the incoming tangential stream of oxidizer gas and causing the fuel to intercept those portions of the oxidizer gas stream which are tending toward higher angular velocity.

The significant difference between the two flows is residence times of particles in the reaction zone 22. For like particles injected at the same radii in the two types of flows, the stay time is much longer in the wheel flow than in the vortex flow. Thus, to provide a longer in-flight time, we prefer to operate under conditions which favor the establishment of a wheel-type flow in the reaction zone 22. This is a very important feature of our invention which enables us to achieve increased power densities. For example, a conventional Lurgi gasifier operated at 20 atmospheres pressure has a power density of 10 pounds of coal per hour per cubic foot of reaction chamber. Our apparatus operated at the same pressure will have a power density of 760 pounds of coal per hour per cubic foot of reaction chamber.

The advantage of maintaining a predominatly wheel-type flow in our apparatus are best appreciated by considering the aerodynamics of the particle carried in the swirling gases. To reiterate, our primary objective is to suspend large particles for a flight time of sufficient duration so that they will be substantially completely reacted and reduced to slag droplets before impinging the walls of the reaction chamber. The apparatus and its operation are designed to minimize radial acceleration of unburned and partially-burned particles while assuring that most of the slag droplets will reach the walls. How this is achieved is best understood by considering particles in the reaction zone.

Consider a particle entering the reaction zone. Only drag forces act on this particle initially. Assuming a sperical particle, the drag force ($F_d$) is $$F_d = \frac{C_d \rho_g D_p^2 (V_g - V_p)^2}{2g}$$

where
- $C_d$ is the drag coefficient,
- $\rho_g$ is the gas density,
- $D_p$ is the particle diameter,
- $V_g$ is the velocity of the gas,
- $V_p$ is the velocity of the particle,
- g is the acceleration of gravity. Small particles, however, because they are light weight, i.e., have a low mass, are more affected by the drag force exerted on them by the swirling gases than larger, heavier particles. Since all the particles we employ are relatively small, almost all these particles due to the drag forces acting on them will attain the same velocity of the swirling gases almost instantaneously.

With the particles rotating, centrifugal force ($F_c$) is exerted on the particles. From basic physics $$F_c = MR\omega^2$$

where
- M is particle mass,
- R is the radial position of the particle, and
- $\omega$ is the angular velocity of the particle. From this equation, one can see that the more massive a particle the greater will be the centrifugal force urging the particle toward the inner wall of the chamber. We control the angular velocity so that the centrifugal force is not so great that the velocity imparted to the particles carry them to the chamber wall prior to complete combustion. In a vortex-type flow, with high velocities near the center of the chamber, any fuel particle injected into the rotating stream will be subjected initially to a large centrifugal force and thereby be accelerated rapidly in the radial direction. On the other hand, in wheel flow, under identical injection conditions, the same particle experiences relatively low centrifugal force and, hence, it experiences low initial acceleration in the radial direction. Because the drag force primarily controls the movement of very small particles, these particles tend to stay in the same position in the gases once they are spun up and only move slowly towards the chamber wall.

It can be shown that a particle's tangential acceleration ($dV_\theta/dt$) is given by the expression $$\frac{dV_\theta}{dt} = d\frac{(V_g - V_p)}{dt} \frac{18\mu}{\rho_p D_p^2}$$

Note that particle acceleration is inversely proportional to the square of the particle diameter. Hence, small particles will attain the same velocity of the swirling gas more rapidly than larger particles, and tend not to move relative to surrounding gases to the same degree as large particles which tend to move into different gas environments as they travel and are thus continuously scrubbed by fresh oxidizer gases. This prevents developing a blanket of reaction products around large particles and thereby significantly enhances large particle combustion. The extent to which these advantages are realized in practice depends in part on the degree to which the flow field approximates pure wheel-flow.

Figure 6:
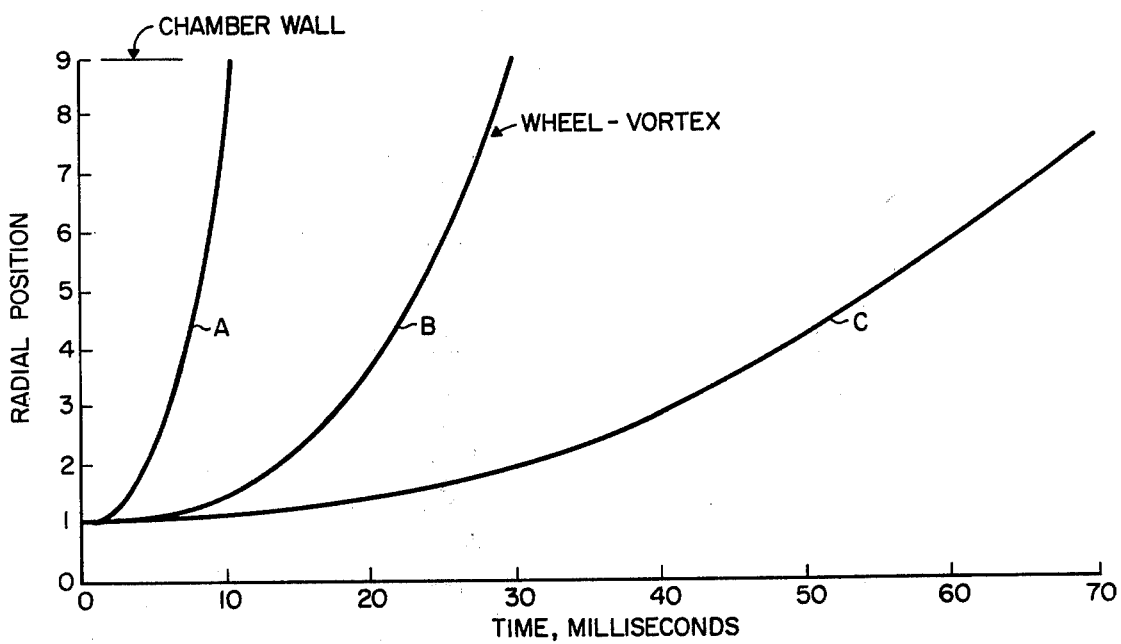

FIG. 6 depicts the behavior of a given size particle in three different flow fields. The radial position of a 75 micron diameter particle in a nominally 1½ foot diameter chamber is studied under three different conditions. Curve A shows that in pure vortex flow the particles would reach the chamber wall in about 10 milliseconds. Curve B shows that in a combined wheel-vortex flow field this particle reaches the wall in about 30 milliseconds. Curve C shows that in a pure wheel flow field the particle reaches the wall in excess of 70 milliseconds. Since the burn time of this particle is greater than 10 milliseconds, pure vortex flow will fail to achieve the result we desire. As the flow field more nearly approximates pure wheel flow, larger particles may be burned in this size chamber. The chamber size could be increased to attain in-flight burning of the particles in vortex flow, but this would impose an economic disadvantage and impair power density and efficiency.

Volume or in flight burning, achieved as described above, provides relatively very high thermal efficiency in that it avoids burning on the wall, concomitant loss of carbon in the slag, and excessive loss of heat to the walls. In addition, wall burning would require that oxidant be brought to the wall and, therefore, necessitate the use of excess air, thereby substantially precluding maintenance of a reducing atmosphere in outer regions of the reaction zone 22. Moreover, by providing longer residence time for a given chamber diameter and enhanced in-flight "scrubbing" of larger particles, we are able to achieve relatively very high power densities. Because our apparatus maximizes the relative velocity between the rotating gases and larger particles, burning of large particles is enhanced so that reaction zone 22 may be operated fuel-rich without excessive deposition of unburned particles on the walls. The ability to operate fuel-rich makes it feasible to hold the reaction zone operating temperatures at a temperature which avoids excessive volatilization of slag. Hence, in our apparatus, 90% or more of the slag content of input fuel may be removed as a liquid before the gaseous reaction products leave the chamber.

Figure 7:
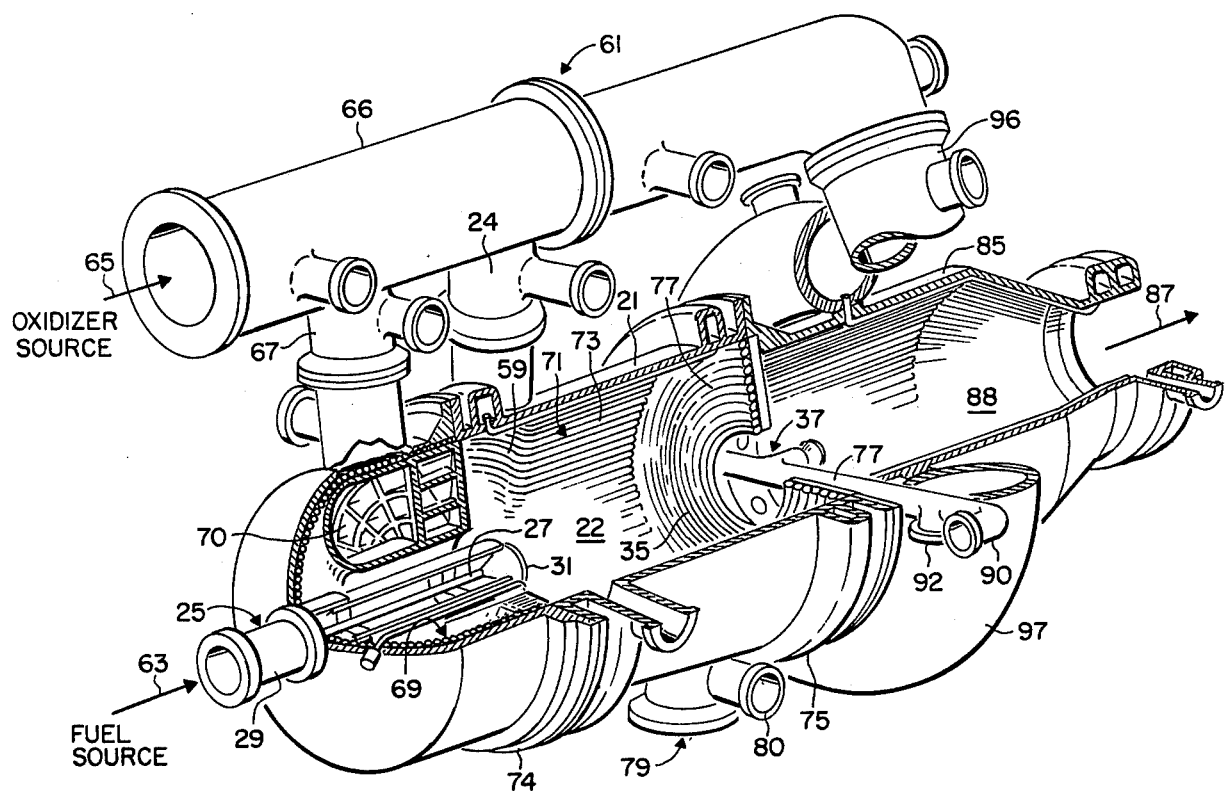
FIG. 7 is a perspective view, partially cut away, of an apparatus in accordance with our invention.
Figure 8:
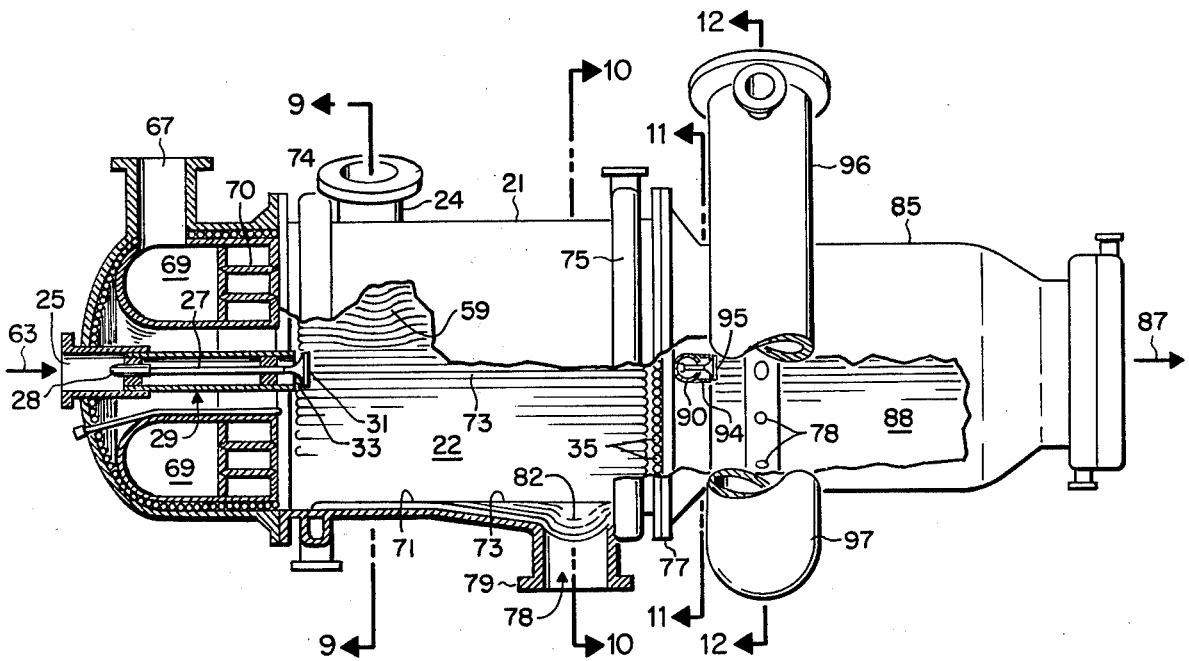
FIG. 8 is a side view, partially in section, of the apparatus shown in FIG. 7.

DESCRIPTION OF AN EXEMPLARY EMBODIMENT:

FIGS. 7 and 8 illustrate an embodiment of our invention suitable for the combustion of pulverized coal to generate a high temperature plasma stream for driving magnetohydrodynamic electric generators. In addition to the components heretofore described in connection with FIG. 1, the apparatus includes an oxidizer manifold 61 through which air from source 65 flows through secondary air duct 24 to injection port 59, and tangentially into the reaction zone 22.

As best shown in FIG. 8, pintle valve 25 receives fuel from a fuel source 63 with the fuel flowing through inlet tube 29 and being deflected radially outward from pintle end portion 31. Longitudinal adjustability of the pintle is provided by an externally threaded pintle sleeve 28 carried on the pintle and rotatively supported within an internally threaded bore.

Figure 13:
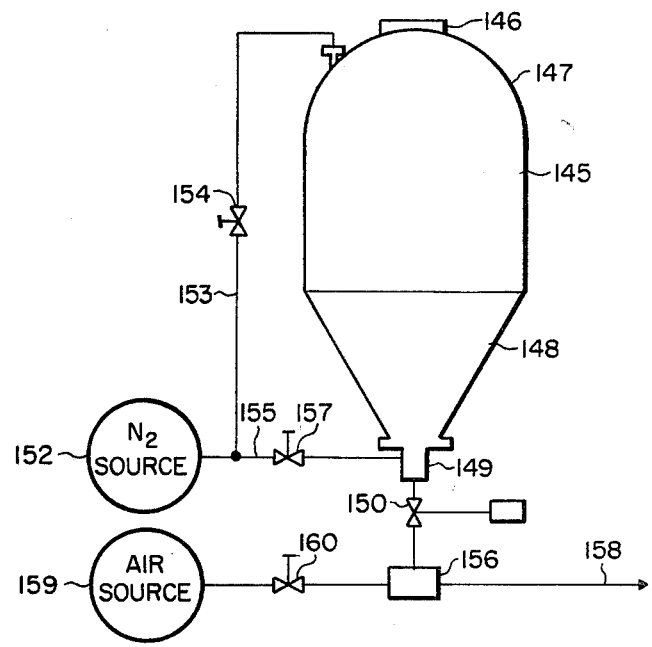
FIG. 13 is a schematic diagram of a dense phase reactant transport apparatus in accordance with our invention.

The fuel source 63 preferably is a separate fuel mixing and dense phase transport apparatus illustrated in FIGS. 13 and 14 and described in more particular detail hereinafter. The essential function of source 63 is to provide pulverized coal entrained in a flow of carrier fluid with the coal to fluid mass ratio being controllable over a range from 0:1 to 100:1. The entrained flow of pulverized coal mixed with carrier fluid has flow characteristics similar to those of a viscous fluid and, as the entrained flow is dispersed through the pintle valve 25, the finely divided coal is sprayed therefrom as shown by the bell-shaped dispersion envelope 41 of FIG. 1.

Figure 9:
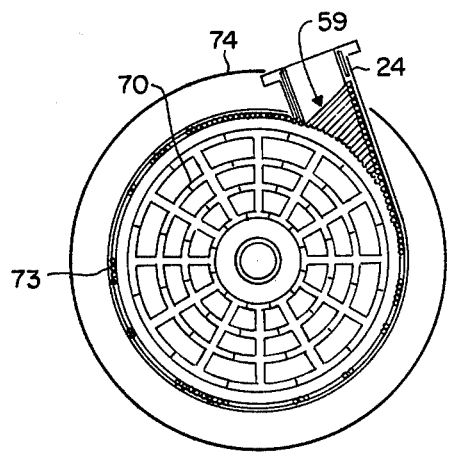
FIGS. 9 through 12 are cross-sectional views taken respectively at the planes, 9—9, 10—10, 11—11, and 12—12 of FIG. 8.

In FIGS. 7 and 8, high temperature compressed air from oxidizer source 65 is fed through manifold 61 to provide first, second, and third streams of air to the apparatus. Manifold 61 includes main duct 66 extending from source 65 substantially parallel to the longitudinal axis of the combustion chamber 21, and a first branch duct 67 extending perpendicularly toward the chamber 21 and feeding high pressure primary air into a plenum 69 from which it passes through a multi-aperture flow straightening device 70. This primary air passes into the reaction zone 22 in a direction substantially parallel to the longitudinal axis of the chamber 21 and through the annular space surrounding the pintle valve 25. In plenum 69 volumetric expansion slows the air velocity and it is directed by the plenum walls to flow through the flow straightening device 70. As best shown in FIGS. 8 and 9, device 70 is a free standing assembly of silicon-carbide vans fitted together to form a multi-aperature assembly through which the primary airstream passes. Alternatively, the vanes may be fabricated of Inconel 800 or another corrosion resistant high temperature alloy consistent with an overall design scheme employing all-metal construction. In such cases the vanes may be water cooled by means of conventional cooling techniques.

Secondary air input is furnished from source 65 by way of main air duct 66 and branch duct 24 to the tangentially aligned air injection port 59 at a velocity sufficient to establish within the reaction zone 22, a rotating mixture consisting of fuel particles, primary air, and secondary air. To maintain wheel-type flow in the reaction zone and to regulate reaction temperatures, it is desirable to control the relative flow values of primary and secondary air, and the mass flow rate of air relative to the input fuel. To accomplish such parametric regulation, conventional fluid valves (not shown) may be used in the air ducts 67 and 24 for preselecting or continuously regulating the respective mass flow rates. In one embodiment we use ceramic (Zerconia) venturi devices inserted in ducts 24 and 67 for limiting the mass flow rates, so that both the sum and the ratio of the two mass flow rates are predetermined.

Control of slagging, so that substantially all the slag content of the fuel is deposited on the walls of the combustion chamber is a feature of considerable importance. Optimized separation of slag from the gaseous reaction products is achieved first by establishing and controlling a wheel-type flow field in the reaction zone 22, and secondly by regulating reaction temperature so that slag volatilization is minimized. Temperature control is achieved by regulating the temperature of the input airstreams and selectively modifying the air-to-fuel ratio so that a fuel-rich mixture is sustained within the reaction zone. Fuel-rich combustion results in a significant portion of the carbon contained in the coal leaving the reaction zone 22 as carbon monoxide, limits the generation of thermal energy in the reaction zone, and thereby controls the operating temperature within reaction chamber 21. Temperature control taken together with centrifugal propulsion of slag particles toward the walls of chamber 21 enables the removal of more than 90% of the slag from the stream of gaseous reaction products before such products exit from the reaction zone through the central aperture 37 of baffle 35.

If inner surface 71 of the combustion chamber were coated with a refractory ceramic material, the erosive effects of the slag, high velocity flow, and burning fuel particles within the reaction zone would tend to strip the refractory from the walls of the chamber 21 and, once that has occurred, begin to attack the metal inner surface 71 of the chamber. We avoid this difficulty by forming a protective layer of solidified slag deposited upon surface 71 thereby limiting further attack. To that end, metal coolant conduits 73 are provided on the inner surface 71 of the chamber 21. Conduits 73 form a water-cooled lining for the reaction chamber 21 which retains and solidifies enough slag to form a protective slag layer having a relatively low-thermal conductivity. Conventional arrangments are used for feeding coolant to the conduits 73, i.e., manifolds 74 and 75.

Figure 10:
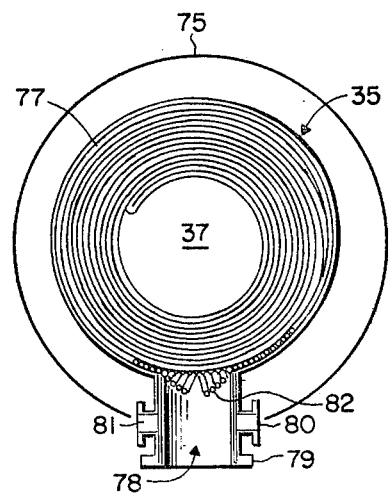
Figure 11:
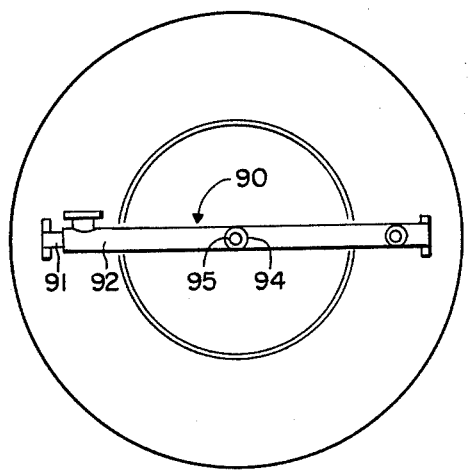

As shown best in FIGS. 7, 8, and 10, baffle 35 is an annular plate having a double-coil of coolant conduit 77 disposed on its surface and positioned substantially normal to the longitudinal axis at the downstream end of chamber 21. One function of baffle 35 is to stop slag droplets which have not yet reached the walls of the chamber 21 and thereby minimize the slag and ash content of the gaseous reaction products exiting from the chamber. In addition, the rotating stream of gaseous reaction products, upon arriving at the downstream end of the chamber, is forced by the baffle 35 to move radially inward, toward aperture 37. As the high velocity rotating gas stream is forced inwardly, the angular velocity increases by a factor of 3 or 4 or more. This sharp increase in centrifugal forces results in substantially all of the slag content of the fuel being centrifuged out of the gaseous reaction products and deposited as a liquid slag layer on the inner surface 71 of the combustion chamber and on the baffle 35.

The liquid slag flows by gravity toward the bottom of the reaction chamber, through slagging port 78, and out to a slag trap 79 at the bottom of the chamber. As best shown in FIGS. 8 and 10, the short section of cylindrical conduit which defines slagging port 78 is cooled by cooling water flowing through a conventional water jacket having inlet 80 and outlet 81. In the region of the slagging port 78, the coolant conduits 73 are formed to provide a shaped inner-surface portion 82 defining a substantial aperture between the adjacent conduits 73 at the location of the slagging port 78. The slag-dumping subsystem preferably includes a pressurized slag reservoir (not shown) to prevent the escape of gaseous reaction products through the slagging port.

In its application to magnetohydrodynamics, our apparatus additionally includes a secondary reaction chamber 85 coupled to the downstream end of chamber 21 and defining a second reaction zone 88. Secondary chamber 85 receives gaseous reaction products from chamber 21 and modifies the high temperature gaseous reaction products to produce at its output 87 a high velocity plasma suitable for injection into the plasma channel of a magnetohydrodynamic (MHD) electric power generating device. Such MHD systems form no part of the the present invention, are well known in the prior art, and are not further described herein.

Gaseous reaction products passing out of reaction zone 22 through aperture 37 pass into the second reaction zone 88. Immediately downstream from baffle 35, we provide a reactant injection assembly 90 for injecting into the high temperature gas stream selected chemical reactants such as, for example, potassium carbonate. Injector assembly 90 includes a reactant input tube 91 which extends transaxially of chamber 85 and is supported coaxially with a coolant conduit 92. Mounted on reactant tube 91 and substantially at the axis of chamber 85 is a reactant injector comprising a sleeve 94, having a pintle 95 supported coaxially therein. This coaxial pintle reactant injector preferably is a miniature version of the coaxial pintle valve 25 heretofore described and shown in FIGS. 1 and 8. For efficient performance of magnetohydrodynamic generators, it is desirable that gases passing through the magnetohydrodynamic channel have electrical characteristics corresponding to those of a highly conductive fluid. Thus in the magnetohydrodynamic application of our invention, it is preferred that the gas stream 87 exiting from reaction chamber 88 be substantially completely and uniformly ionized. Injection of potassium carbonate assures complete and uniform ionization of the reaction products as they pass through reaction zones 88. In other applications of our apparatus, the reactant injection assembly 90 may be employed for injecting substantially any additive or chemical reactant into the swirling gas stream immediately after it passes through aperture 37 into reaction zone 88.

Figure 12:
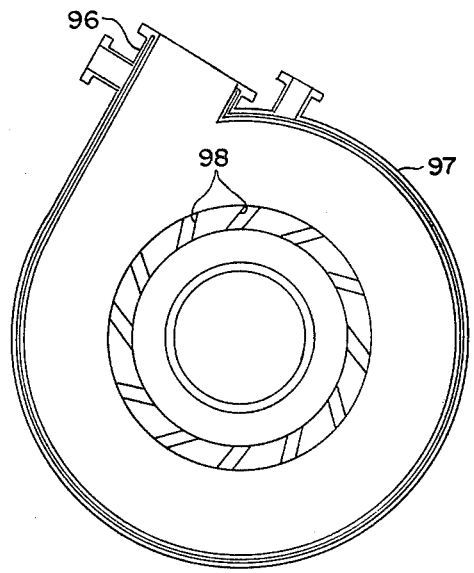

Immediately downstream from the reactant injector 93, the second chamber 85 is provided with an arrangement for injecting a volume of preheated air necessary to complete stoichiometric reaction. This tertiary air is injected with a sufficient tangential velocity component to null out, by momentum interchange, the angular velocity of the gaseous reaction products received from aperture 37. More specifically, this second stage deswirl subsystem comprises tangentially extending air duct 96 receiving high temperature air from manifold 61 and transporting the same into toroidal air distributor 97 which, as best shown in FIGS. 8 and 12, extends circumferentially around the second chamber 85 and has, at its inner periphery, twelve air injection ports 98 for introducing high velocity tangential airstreams from the distributor 97 into reaction zone 88. In using our apparatus as the plasma source for a magnetohydrodynamic power system, it is desirable that the output plasma stream have substantially no angular velocity. To that end, regulation of the air flow through duct 96 and distributor 97 may be used to reduce to zero the angular velocity of the gas stream within chamber 85. For other applications in which angular velocity is irrelevant, volumetric control of the air supplied through duct 96 may be used for preselecting or continuously varying stoichiometry with reaction zone 88. As required, air manifold 61 and the several ducts extending therefrom are provided with external water cooled jackets. Conventional manifolds are used for feeding coolant to the water jackets.

DENSE PHASE FUEL TRANSPORT

Pulverized fuel, e.g. coal, is transported from a ball mill or storage facility to the reaction chamber 21 in a dense phase mixture with carrier gas through a tubular conduit. Because reaction chamber 21 operates at pressures in the range from two to eight atmospheres or higher, the fuel transport subsystem preferably is pressurized to substantially the same level. FIGS. 13 and 14 illustrate the apparatus by which the pressurized dense phase fuel transport is implemented in accordance with a preferred embodiment of our invention. As shown in FIG. 13, the coal hopper 145 is filled with powdered coal normally pulverized to a fineness of the order of 200 mesh from a coal storage facility (not shown) through a fill hatch 146 located at the top of the domed portion 147. Filling of the pressurized coal hopper may be accomplished by means of an intermediate pressurizable transfer vessel (not shown) or, for example, by a conventional screw pump for handling pulverized coal. In addition to the domed portion 147, the coal hopper comprises an intermediate cylindrical portion and a lower conical portion 148 having a 30° included angle. At the base of conical portion 148, we provide a coal fluidizing injector 149 from which the pulverized coal flows through a throttling valve 150 to an eductor assembly 156 which operates to accelerate the coal particles to a velocity of about 20 feet per second and transport the coal, in a dense phase mixture with air or another suitable carrier gas through a coal feed line 158, for continuous injection into the reaction chamber 21 (FIGS. 7 and 8). It will be understood that the coal feed line 158 extends from the eductor assembly 156 and is connected to inlet tube 29 of pintle valve 25. Carrier gas for pressurizing the coal hopper 145 is supplied from gas source 152 over line 153 and through a control valve 154 to an input connection at the top of the hopper. Carrier gas is also supplied from the source 152 by way of a line 155 and a control valve 157 to the fluidizing injector 149. Compressed gas for energizing the eductor assembly 156 is fed from a gas source 159 through a control valve 160 to the input of the eductor. The fluidizing injector 149 and the eductor assembly 156 are illustrated in detail in FIG. 14, which is a cross-section taken along the cylindrical axis of the fluidizing injector.

Figure 14:
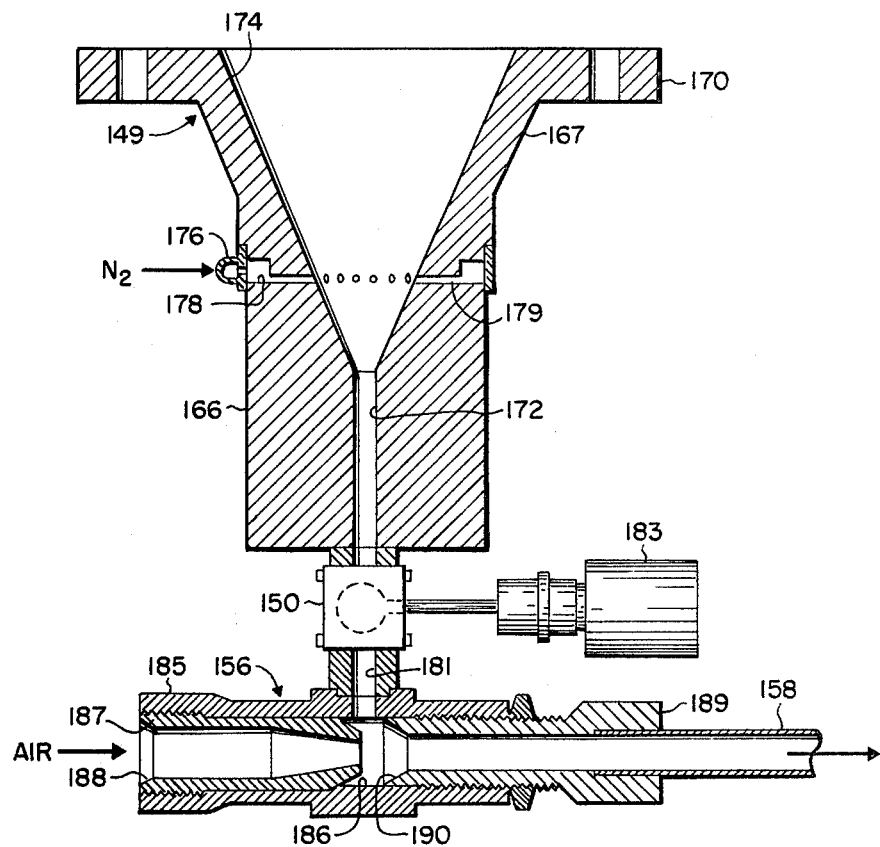
FIG. 14 is a side view partially in cross-section of a portion of the apparatus of FIG. 13.

As shown in FIG. 14, the fluidizing injector 149 comprises a substantially cylindrical metallic member 166, having at its upper end a conical portion 167 and a planar flange 170. Flange 170 is connected to and sealed to the bottom end of the conical portion 148 of the coal hopper. Member 166 has a ½ inch diameter central bore 172 extending vertically upward and opening into a conical aperture 174 which has a 45° included angle between opposite walls 175 and is about six inches in diameter at its upper end. Intermediate the ends of conical aperture 174, and on the periphery of member 166, there is provided a circumferentially extending gas manifold 176. The gas manifold 176 is bonded to the surface of member 166 covering a circumferential groove 178 into which gas from the manifold is distributed. From groove 178, a plurality of equiangularly spaced holes 179 extend radially inward through the wall of member 166 to the conical aperture 174. Pressurized carrier gas from source 152 is fed through control valve 157 to the manifold 176 from which it is distributed and flows through the sixteen radial holes 179 into the conical aperture 174. This carrier gas injection fluidizes the pulverized coal contained within aperture 174 and propels a mixture of carrier gas and powdered fuel downwardly through central bore 172. From the base of member 166, the flowing mixture passes through throttling valve 150 and into a vertically extending bore 181 of eductor assembly 156. The fuel throttling valve 150 may be a conventional ball valve having its control shaft coupled to be rotated by a gear motor 183. Conventional circuitry is used to monitor and control the gear motor shaft position and thereby regulate the fuel flow through throttling valve 150 in accordance with the fuel to carrier gas volumetric or mass ratio desired.

The eductor assembly 156 comprises a housing 185 having a cylindrical bore 186 extending horizontally therethrough and a vertically extending bore 181 which connects with the horizontal bore 186 and through which the pressurized coal flows from throttling valve 150. A convergent nozzle 187 is secured within horizontal bore 186 by threads 188 and is operative for injecting high pressure carrier gas into the housing 185 wherein the gas jet impinges the downwardly flowing stream of pulverized coal and accelerates the same outwardly through a connector 189 and coal feed line 158. The inner end of connector 189 is provided with a conical bore 190 which funnels the mixture of pulverized fuel and carrier gas into feed line 158. The convergent nozzle 187 is coupled to and fed with compressed carrier gas from source 159 (FIG. 13) by way of control valve 160.

In operation, the fluidizing injector 149 contains, in conical aperture 174, a region of high turbulence wherein the pulverized coal is mechanically agitated and lubricated so that a smooth and reliable flow of coal and carrier gas move downwardly through central bore 172. The carrier gas infeed also balances the overhead pressure of the pressurized coal hopper 145 so that hopper pressure is maintained, even though the volume of coal contained in hopper 145 gradually decreases. In the preferred method of operation, the fluidizing injector provides a fluidization volumetric flow rate equal to the volumetric flow rate of the coal plus any carrier gas lost under steady state running conditions.

When steady state coal flow has been established downwardly through throttling valve 150, the flowing coal is diluted and accelerated by the compressed carrier gas injected through convergent nozzle 187 in the eductor assembly. The converging internal bore of nozzle 187 provides a focused gas jet such that with the gas velocity and coal mass flow rate properly adjusted, the coal particles are accelerated to a velocity of about twenty feet per second and flow continuously at that velocity through feed line 158 to the reaction chamber 21.

The solid fuel is normally pulverized to a fineness of the order of 200 mesh; however, a range of sizes may be used. We have established that solids-to-gas ratios as high as about 100:1 are feasible. With fluidizing ($N_2$) pressures ranging from 10 to 80 pounds per square inch, we have achieved ratios of the order to 50:1 while maintaining relatively uniform flow rates. After the coal dust is loosened by fluidizing through the fluidization injector 149 for several minutes, the carrier gas input to the fluidization injector may be turned off and the dense phase coal transport continued simply by maintaining pressurization of the coal hopper 145 and compressed gas feed to the eductor assembly 156. The solids-to-gas ratio and the transport velocity in feed line 158 may be continuously controlled or alternatively set at any preselected value within the above ranges by controlling the coal throttling valve 150 and gas feed valve 160. Conventional circuitry including flow rate transducers are used for monitoring these operational parameters and providing feedback signals to energize control motor 183 and thereby regulate valve 150, as well as controlling input air velocity and pressure.

While we nominally use dry nitrogen or air as the fluidizing carrier gas it is to be understood that substantially any liquid or gas, including petroleum liquids and hydrocarbon gases may be employed.

OPERATION OF THE PREFERRED EMBODIMENT

In the operation of our apparatus as a power source for driving magnetohydrodynamic generators, finely divided coal which has been processed to the 100–200 mesh level is entrained in a flow of near ambient temperature air. For applications requiring minimal enthalpic loss such as plasma generation, the mass ratio of solid fuel particles to ambient air carrier is in the range of 30–100:1. This dense phase fuel transport limits the amount of relatively cold air introduced into the combustion zone 22 and thereby aids in maximizing the output plasma temperature levels. The entrained flow of coal particles is fed through the pintle valve 25 and is directed radially outwardly into combustion zone 22, in the bell-shaped dispersion pattern 41 (FIG. 1).

The oxidizer utilized in plasma generation is generally preheated air at approximately 2900° F. This preheated air may be provided with "make-up" oxygen prior to introduction to the combustion zone if required by the specific nature of the coal fuel being utilized. A helical wheel-type flow of preheated air is established within combustion zone 22, and the entrained flow of coal in carrier gas is directed into the wheel-type flow. To hold combustion temperatures below the slag volatilization temperature, combustion zone 22 preferably is operated fuel-rich in the range of about 0.4–0.9 of the stoichiometric amount of oxidizer. This produces temperatures in zone 22 ranging from 3000° F. to 3800° F., depending on the composition of the slag. The high temperature gaseous combustion products exit from combustion zone 22 through central aperture 37 of baffle 35 at a temperature of approximately 3400° F. These gases from the fuel-rich atmosphere within combustion zone 22 will contain slag droplets smaller than approximately 10 microns diameter, as well as a modest amount of volatilized slag.

As previously described, additional oxidizer required to bring the gaseous combustion products to stoichiometry and complete combustion is introduced into second chamber 85 through input duct 96 and distributor 97. Completing the combustion of CO and $H_2$ in reaction zone 88 increases the temperature level of the gas stream from approximately 3400° F. to approximately 5100° F. at outlet 87. Outlet 87 may be connected directly to a magnetohydrodynamic generator or other system for the utilization of thermal and/or gas-kinetic energy. Slag droplets, ash, and fuel particles which are not burned or captured on the walls of chamber 21 are relatively very small. Hence, for the most part, they are gasified upon being exposed to the higher temperature regime within reaction zone 88.

ALTERNATIVE EMBODIMENTS

In the previously described preferred embodiment of our apparatus, pintle valve 25 is aligned with and positioned substantially on the longitudinal axis of combustion chamber 21. While that coaxial symmetry has certain advantages, it should be understood that our invention is not so limited. In alternative embodiments of our invention, the pintle valve 25 may be spaced from the longitudinal axis and/or positioned with inlet tube 29 at substantially any angle relative to the longitudinal axis of chamber 21.

Figure 15:
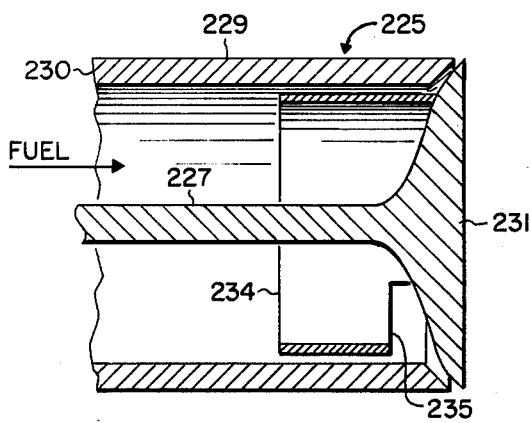
FIGS. 15 and 16 are side views partially in section of an alternative embodiment of a portion of the apparatus shown in FIGS. 7 and 8.
Figure 16:
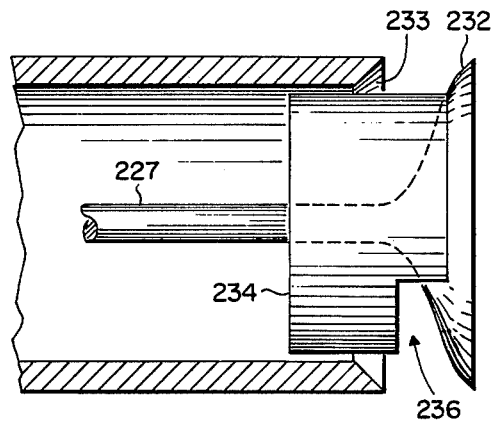

In various applications of our invention, including especially those applications where it is desired to tailor the rotating flow within the reaction zone 22 toward pure wheel flow, it may be desirable to modify the bell-shaped fuel distribution envelope 41 (FIG. 1) by injecting pulverized fuel throughout only a limited angular segment of the pattern. FIGS. 15 and 16 show a modified pintle valve used for creating a fuel dispersion pattern corresponding to an angular segment of the bell-shaped envelope 41. This modified pintle valve 225 includes a fuel inlet tube 229 substantially identical to the inlet tube 29 of the valve shown in FIG. 8. At an input end 230, a stream of carbonaceous fuel mixed with a carrier gas flows into the pintle valve 225 through the interspace between tube 229 and the centrally aligned pintle 227. At its right hand end as shown in FIG. 15, the pintle carries an enlarged circular end portion 231 having a tapered surface 232 which seals against valve seat 233 when pintle 227 is moved longitudinally toward the left. In this embodiment, the pintle valve 225 differs in that circular end portion 231 includes a thin walled cylindrical skirt 234 formed integrally with end portion 231 and extending toward the input end of tube 229 closely adjacent to the inside wall of the inlet tube. As indicated at 235, the skirt 234 has a portion cut away closely adjacent end portion 231 to form a aperture 236 which extends circumferentially of the skirt 234 through an angle corresponding to the angular extent of the fan-shaped fuel distribution pattern desired. For example, aperture 236 may extend through an included angle of about 60°. In this embodiment the pintle shaft 227 may be slidably supported for motion longitudinally of the inlet tube 229 without rotating. When the pintle shaft 227 is moved to its closed position (as shown in FIG. 15) tapered portion 232 seals against valve seat 233 throughout its periphery and thereby reduces the flow of fuel and carrier gas substantially to zero. When the pintle is moved to its fully opened position as shown in FIG. 16 skirt 234 maintains a sliding seal against the inner wall of inlet tube 229, thereby precluding the outflow of fuel and carrier gas except in the region of aperture 236. Thus, as shown in FIG. 16, the pressurized stream of fuel and carrier gas flowing through inlet tube 229 passes out through aperture 236 and is sprayed into the combustion zone throughout a limited angular-segment pattern corresponding to an angular portion of the bell-shaped envelope 41 of FIG. 1. As the pintle 227 is moved from the open position shown in FIG. 16 toward the closed position as shown FIG. 15, the aperture 236 is incrementally closed off by valve seat 233 to gradually reduce the mass flow rate of fuel and carrier gas injected into the reaction chamber. While we have illustrated this segmented pintle valve as including the peripherally extending aperture 236, it will be understood that other equivalent structures, such as plurality of angularly spaced cylindrical holes, may be employed.

Figure 17:
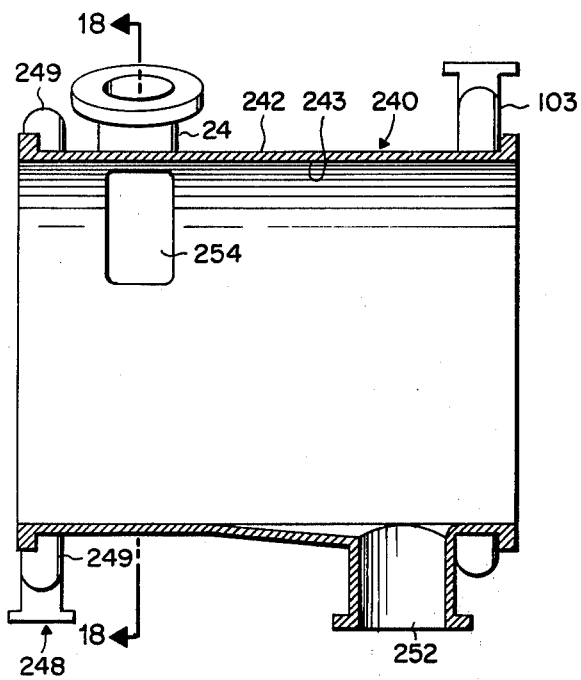
Figure 18:
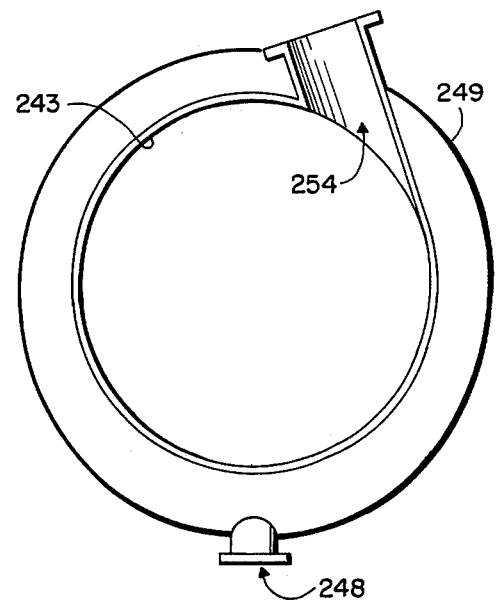
FIG. 18 is a cross-sectional view taken at the plane 18—18 of FIG. 17.
Figure 19:
FIG. 19 is a partial sectional view showing the details of the structure illustrated in FIG. 17.

An alternative reaction chamber structure shown in FIGS. 17, 18, and 19, is advantageous for higher pressure applications. As shown in FIG. 17, the chamber 240 is a double wall structure having an outer wall 242 and an inner wall 243. Inner wall 243 has coolant passages 244 chemically milled on an outer surface thereof, as seen in FIG. 19. The coolant passages are closed by seam welding outer wall 242 to rib portions 246 between passages 244. The heat exchange sub-system receives coolant at inlet 248 of water manifold 249, distributes the coolant through passages 244, and exhausts the coolant through outlet manifold 250. The deposition of a layer of slag over metal inner surface 243 of the chamber reduces heat transfer to the coolant and thereby minimizes enthalpic loss from the stream of gaseous combustion products.

For a given combustion temperature, as determined by the regulation of relative input rates of fuel and oxidizer, the slag produced during combustion collects as a coating of solidified slag over metal inner surface 243 of the chamber 240 until the thickness of the insulating layer of solidified slag is such that any slag subsequently disposited is substantially insulated from the cooling effect of the water in heat exchange passages 244. At that point, equilibrium between the solid and liquid phases of the slag is reached, and a flowing layer of liquid slag will cover the insulating layer of solidified slag. This layer of liquid slag flows, by gravity, toward a lower portion of the combustion chamber where it is removed at a liquid slag trap 252. In FIG. 17, aperture 254 is the tangential oxidizer injection port corresponding to port 39 of FIGS. 7 and 8.

METHOD FOR MAKING PRODUCER GAS OR SYNTHESIS GAS

The apparatus 10 of our invention may be adapted to make producer gas in air under conditions which favor the formation of carbon monoxide. The producer gas from the apparatus 10 is forwarded to a conventional gas or oil fired burner and serves as fuel for the burner. Thus, our apparatus provides a means for burning coal to produce a gaseous fuel which can be used as a substitute for natural gas or oil.

Figure 21:
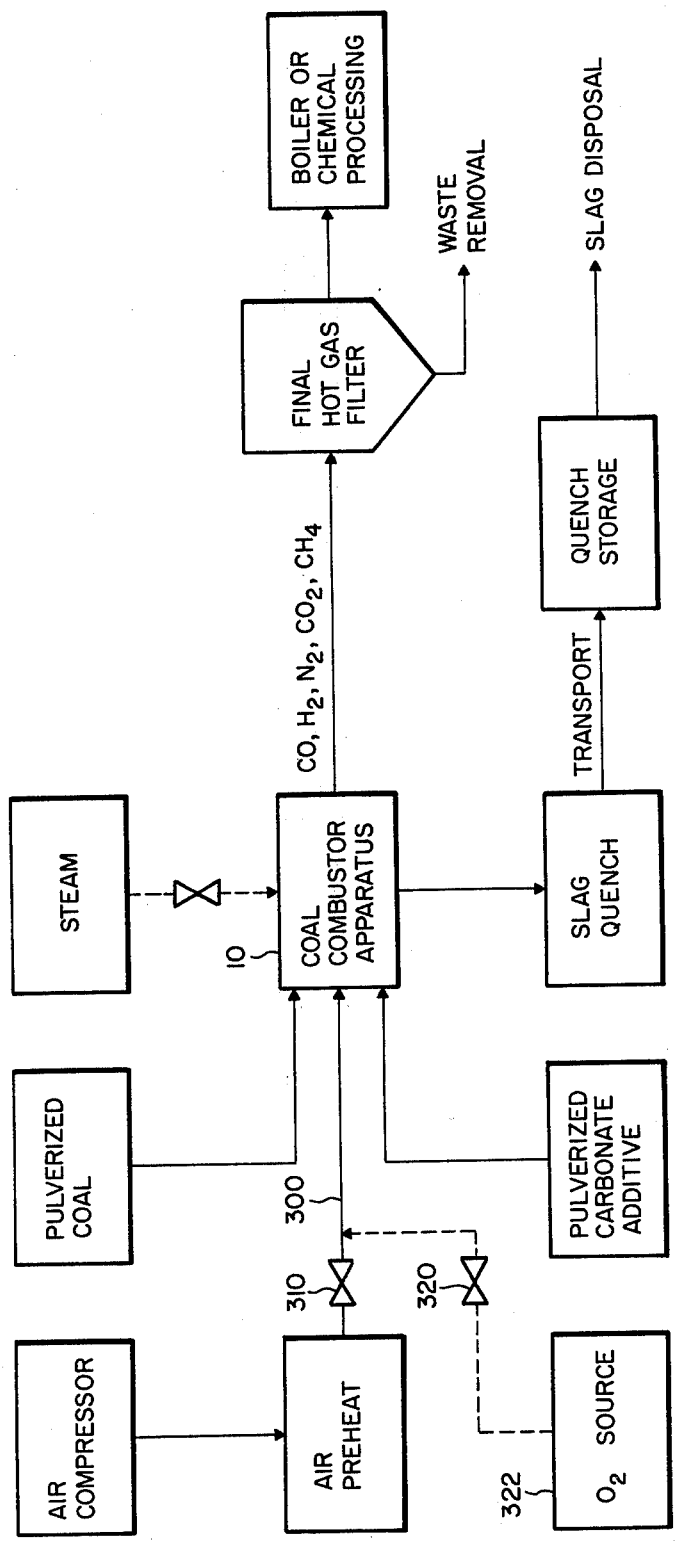
FIG. 21 is a flow diagram illustrating how our apparatus is used to pyrolize coal, retort shale, or flame crack oil.

The system illustrated in FIG. 21 schematically represents the way in which our apparatus is used to make producer gas. The coal combustor apparatus 10 is of the type previously described in which the particles of fuel are burned before they would strike the internal wall of the apparatus. Compressed air, preferably pre-heated, is fed through valved line 300 into the reaction chamber of the apparatus 10 in the swirling fashion previously described. Pulverized coal is injected through the pintle (not shown). In order to remove $SO_x$ from the reaction products, carbonates would be added to the reaction zone. By controlling the mass flow rates of the coal and air, the amount of carbon monoxide would be maximized. The combustible products would be carried in the exhaust gases optionally through a hot gas filter, to the gas or oil fired burner. Any slag particles exiting with the exhaust gases would be trapped in the filter and removed as waste. Slag would be withdrawn from the apparatus 10 and dumped at a suitable disposal site.

When it is desirable to provide a synthesis gas, oxygen is used in place of air and steam is injected into the reaction zone of apparatus 10. Consequently, there will be little nitrogen in the exhaust gases exiting the apparatus 10. In this event the valve 310 in line 300 would be closed and the valve 320 which controls the flow of oxygen from an oxygen source 322 would be opened. The mass flow rates of coal, oxygen, and steam would be controlled so that the desired amount of carbon monoxide and hydrogen would be produced in apparatus 10. The synthesis gas would then be forwarded through the hot gas filter to a chemical plant which would use the synthesis gas to produce the desired chemicals. In producing synthesis gas it would also be desirable to add carbonates to remove $SO_x$ from the exhaust gases.

COAL PYROLYSIS, SHALE RETORTING, AND FLAME CRACKING

Figure 20:
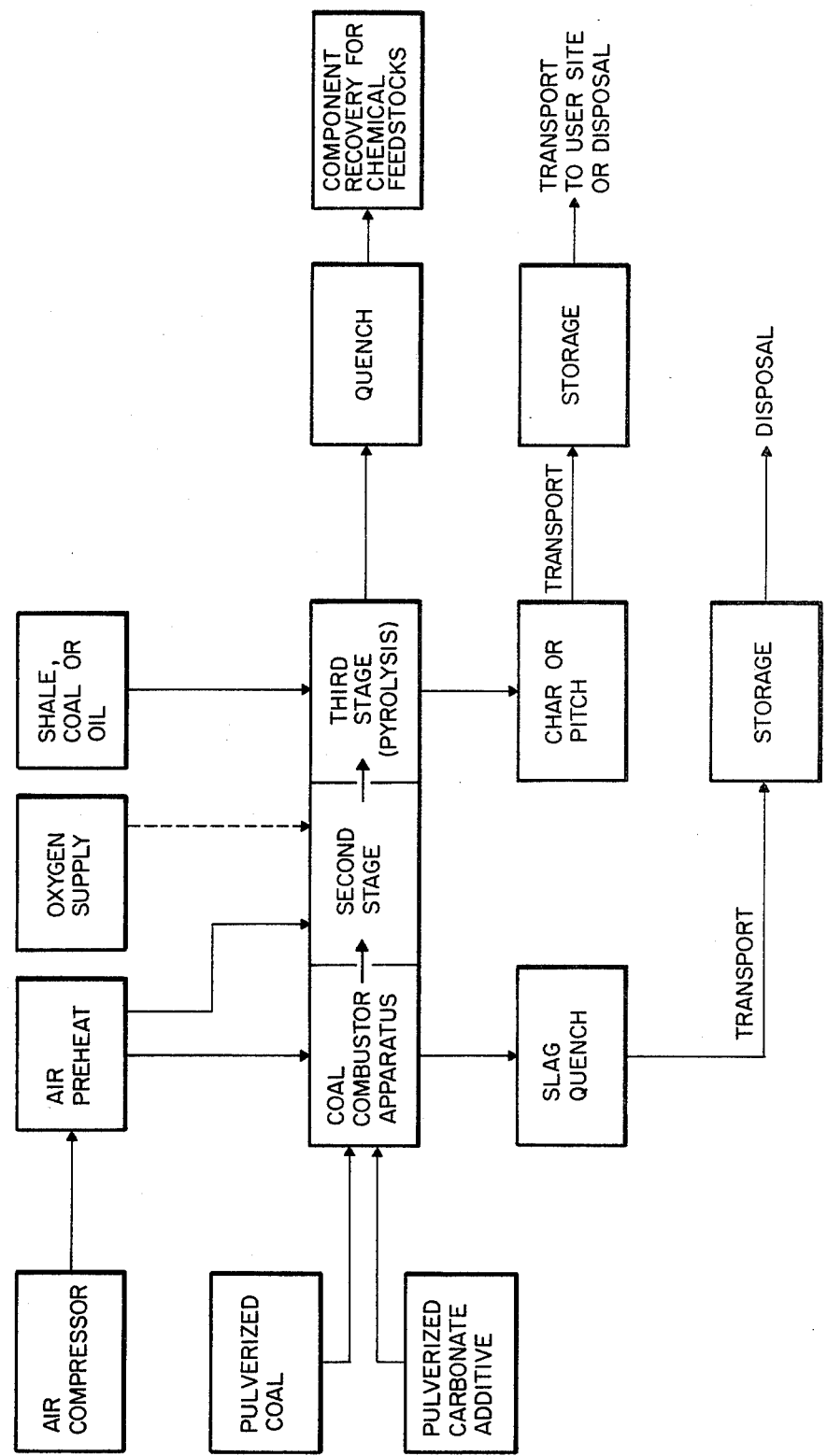
FIG. 20 is a flow diagram illustrating how our apparatus is used to make producer gas or synthesis gas.

The apparatus 10 of our invention can also be used to process coal, shale, or oil. As illustrated in FIG. 20, the preferred system would include at least three stages. The first stage of the system would be the apparatus 10. The second stage would be an afterburner which completes the combustion of the reaction products exiting the apparatus 10. Either preheated air or oxygen could be injected into the second stage to maximize the temperature of the exhaust gases exiting the second stage. The third stage would be a reaction chamber into which the shale, coal, or oil is injected. The hot gases from apparatus 10 contact the shale, coal, or oil injected into the third stage. In the case of coal, water would be removed to dehydrate the coal, hydrcarbons would be volatilized, and the remaining char would be more suitable for transport. In the case of shale, the carbonaceous material of the shale would be decomposed to form oil which would then volatilize and be removed from the third stage. If oil was injected into the third stage it would be flash cracked into lighter weight hydrocarbons.

As previously discussed the pulverized coal injected into the combustor apparatus 10 could be mixed with carbonates to reduce the formation of $SO_x$. Slag would be removed and disposed of. Exhaust gases from the third stage would be cooled by quenching, and any volatile materials leaving the third stage with these exhaust gases could be recovered and used for chemical feed stocks.

We claim:

1. In a method of combusting carbonaceous fuel, the steps of:
   injecting particulate carbonaceous fuel, fluidized with a carrier fluid, into a combustion zone and through the center portion of one end thereof;
   directing a first stream of oxidizer gas longitudinally into said zone through said fuel injection end, and a second stream of oxidizer gas tangentially into said zone, wherein the mass flow ratio and velocities of said streams are regulated to provide wheel type flow in the combustion zone and to convert substantially all of the carbon content of the fuel particles to gaseous compounds within residence times of about 100 milliseconds.

2. The method of claim 1 comprising the additional step of preselecting the relative mass flow rate of the first and second oxidizer gas streams to control aeroballistic conditions within said wheel-type flow field so that substantially all of the fuel particles are gasified before reaching the periphery of the combustion zone.

3. The method of claim 1 comprising the additional steps of:
   regulating the relative rates of introduction of the carbonaceous fuel and said oxidizer gas in a manner to provide for the deposition of substantial amounts of slag on the internal surface of the combustion chamber to form a protective and insulating layer of slag on the internal surface of said combustion zone,
   allowing said slag to reach phase equilibrium between solid and liquid phases thereof,
   exhausting high temperature gaseous combustion products from said combustion zone, and
   continuously removing liquid slag from said combustion zone.

4. The method of claim 1 comprising the additional steps of:
   pulverizing solid carbonaceous fuel,
   entraining said fuel in a flow of carrier fluid, and
   introducing said entrained flow into said combustion zone with an angular velocity substantially less than that of the injected oxidizer streams so that said fuel is distributed over a bell-shaped distribution pattern within said zone.

5. The method of claim 4 wherein the solid carbonaceous fuel is pulverized into particles having diameters less than about 0.2 inches.

6. The method of claim 4 wherein said fuel particles are entrained in said carrier fluid in a mass ratio of fuel to carrier fluid within the range from 1:1 to 100:1 to provide for control of the fuel-to-oxidizer ratio without the use of moving parts in the high temperature portions of the combustion chamber.

7. The method of fuel combustion comprising the steps of:
   entraining carbonaceous fuel in a flow of carrier fluid to produce an entrained flow having a mass ratio of fuel to carrier fluid within the range from 1:1 to 100:1,
   introducing said entrained flow into a reaction chamber, through the center of one end thereof,
   injecting a flow of oxidizer gas into said chamber tangentially with respect to said reaction chamber to produce a wheel-type flow field within said chamber,
   regulating the relative input rates of said carbonaceous fuel and said oxidizer gas to produce a fuel-rich combustion mixture and thereby limit reaction temperatures and slag volatilization,
   centrifugally depositing slag from said combustion on an inner surface of said chamber,
   allowing said slag to reach equilibrium between solid and liquid phases,
   removing liquid slag from said chamber, and
   exhausting high temperature gaseous combustion products from said chamber.

8. The method of claim 7 comprising the additional step of introducing selected chemical reactants into said chamber.

9. The method of claim 7 comprising the additional step of introducing into said chamber an entrained flow of a finely divided solid chemical reactant carried in a fluid carrier medium.

10. The method of claim 2 wherein said carbonaceous fuel is injected in a divergent and substantially bell-shaped distribution pattern oriented substantially coaxially with said combustion zone, at least a major portion of said oxidizer gas being injected substantially tangential to said zone, and with the input velocity of said oxidizer gas being controlled so that substantially all slag droplets having diameters larger than about 10 microns are aeroballistically deposited as liquid at the periphery of the combustion zone and thereby separated from the gaseous combustion products before such products exit from the combustion zone.

11. The method of claim 2 in which said combustion zone is contained within a substantially cylindrical combustion chamber having radial and longitudinal dimensions such that substantially all slag droplets are aeroballistically centrifuged toward the walls of the reaction chamber and deposited thereon as a liquid.

12. The method of claim 1 in which substantially all of the carbon content of the fuel particles is converted to oxides of carbon while the fuel is in flight.

13. A combustion method comprising feeding oxidizer gas and particles of solid carbonaceous fuel into a reaction chamber in a manner to provide high velocity rotational flow within the reaction chamber such that substantially all of the particles traverse the reaction chamber within flight times less than 100 milliseconds and essentially all of the carbon content of the particles is converted to oxides of carbon before the particles impinge on the inner wall of the chamber.

14. The method of claim 13 where the fuel particles have diameters less than 0.02 inches.

15. The method of claim 13 where the flight time of the fuel particles is controlled by introducing the oxidizer gas as two separate streams injected, respectively longitudinally and tangentially of said chamber.

16. The method of claim 13 where substantially pure oxygen is used as the oxidizer gas.

17. The method of claim 13 where a carbonate material is injected into and mixed with the rotating flow in the reaction chamber and sulphur compounds contained in the fuel are reacted with such carbonate material to form a slag-like material which is centrifugally deposited on the reaction chamber walls and thereby removed from the gaseous combustion products exiting from the reaction chamber.

* * * * *